May 14, 1957     W. J. MORRILL     2,792,544
SELECTIVE CIRCUITS AND PROTECTIVE SWITCHING ARRANGEMENT
Filed April 27, 1954
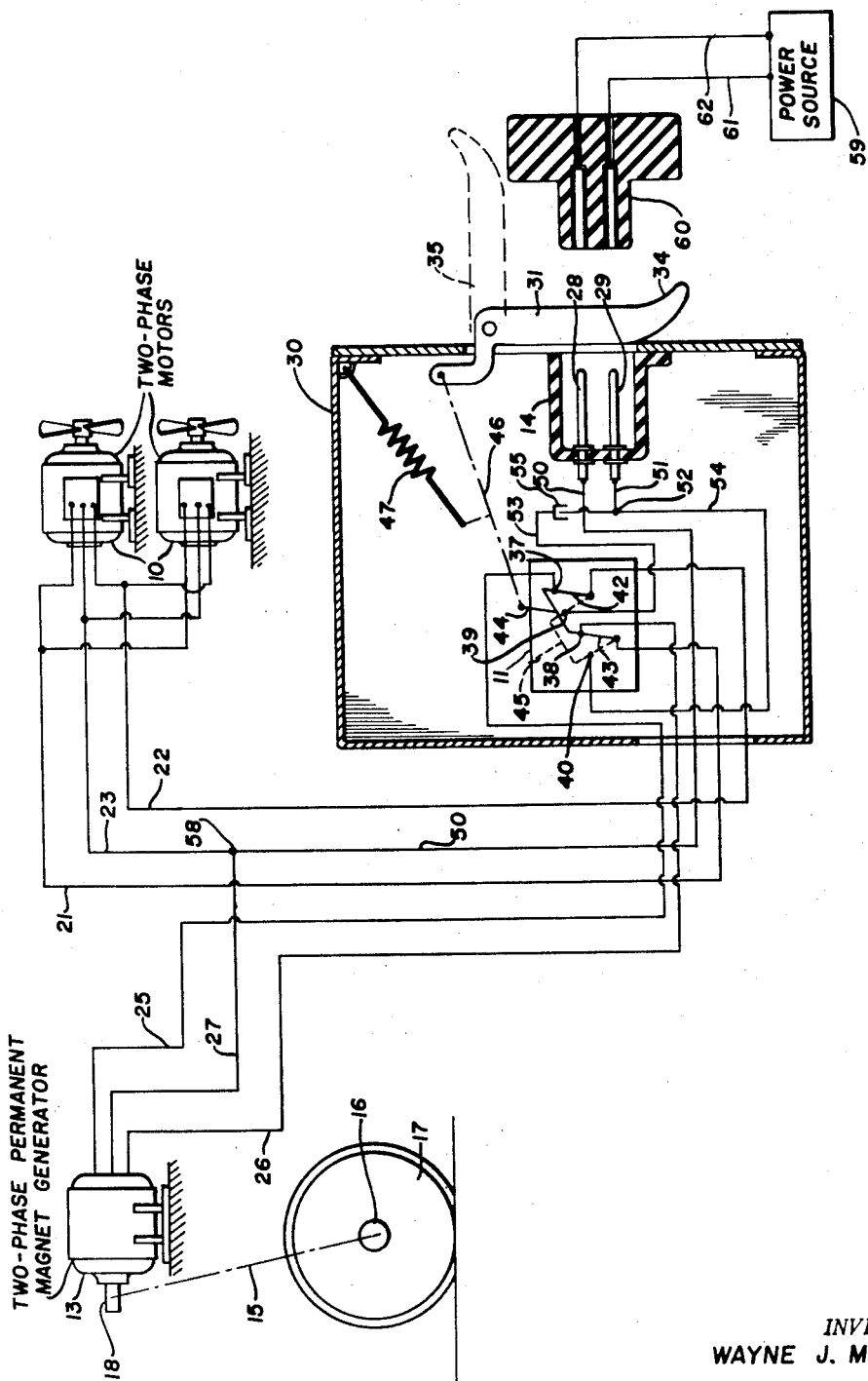
INVENTOR.
WAYNE J. MORRILL
BY Woodling & Krost
Attys.

United States Patent Office 2,792,544
Patented May 14, 1957

2,792,544

SELECTIVE CIRCUITS AND PROTECTIVE SWITCHING ARRANGEMENT

Wayne J. Morrill, Garrett, Ind.

Application April 27, 1954, Serial No. 425,899

6 Claims. (Cl. 318—220)

My invention relates in general to a protective switching arrangement for an electrical circuit having a selectively operated switch which governs control circuits for selectively energizing a motor from a generator or from an independent power source.

An object of my invention is the provision of electrical connections to a two-pole double-throw switch to provide a two-phase motor with either of two sources of energy.

Another object of my invention is to provide a receptacle which may be energized to supply energy to a motor which cannot be energized until another source of energy to the motor is disconnected.

Another object of my invention is to provide a method of making electrical and mechanical connections to a switch whereby one source of energy is unable to be transmitted through the switch until another source of energy is prohibited from being transmitted through the switch.

Another object of my invention is to provide for energizing a motor either from a generator or from an independent power source taken in combination with a closure for a plug receptacle and a selectively operated switch, the closure for the plug receptacle and the switch being connected for complementary movement whereby when the closure blocks off the plug receptacle the motor is energized through the switch from the generator and whereby when the closure is open the plug from the independent power source may be plugged into the receptacle in which case, the motor is energized through the switch from the independent power source and at the same time the generator is isolated from the power source.

Other objects and a fuller understanding of this invention may be had by referring to the following description and claims, taken in conjunction with the accompanying drawing, in which the single figure is a diagrammatic illustration of my protective switching arrangement for my electrical circuit.

With reference to the accompanying drawing, I show two two-phase or polyphase fan motors 10 adapted to be connected through a two-pole double-throw switch 11 to either a two-phase or polyphase generator 13 or a standard receptacle 14. The two-phase fan motors or polyphase load 10 have first, second, and third conductors indicated by the reference numbers 21, 22, and 23, respectively. The two-phase generator 13 has a first, second, and third conductor indicated by the reference numbers 25, 26, and 27, respectively. The two-phase generator 13 is normally operated by means of a pulley 15 which is connected to an axle 16 of a suitable vehicular wheel 17 to a main shaft 18 of the two-phase generator 13. The two-phase generator 13 is of the permanent magnet, rotating field type.

The receptacle 14 has a first and a second energizable terminal indicated by the reference numbers 28 and 29, respectively, and is adapted to be received within a housing 30. A cover 31 having a first and a second position indicated by the dotted lines 35 and the full lines 34 respectively is pivotally connected to the housing 30 in such manner as to permit access to the receptacle 14 when the cover 31 is in the position indicated by the dotted lines 35 and to prohibit access to the receptacle 14 when the cover 31 is in the position indicated by the full lines 34.

The two-pole double-throw switch 11 has a first and a second contactor blade or bridgeable means indicated by the reference numbers 42 and 43, respectively, and has a first and a second contactor point indicated by reference numbers 37 and 38, respectively, engageable respectively by said blades on a first position indicated by the full lines 44 for operating the two-phase motors 10 from the two-phase generator 13.

The switch 11 has a third and a fourth contactor point indicated by reference numbers 39 and 40, respectively, engageable respectively with the contactor blades or bridgeable means 42 and 43 in a second position indicated by the dotted lines 45 for operating the two-phase motor 10 from the standard receptacle 14.

The cover 31 is mechanically connected to the two-pole double-throw switch 11 by a connecting member 46 in such a manner that when the cover 31 is in the second or closed position 34 the switch 11 is in the first position 44; and when the cover 31 is in the first or open position 35, the switch 11 is in the second position 45. A spring 47 is connected to the member 46 and tends to maintain the cover 31 in the second position. The first terminal 28 of the receptacle 14 has a conductor 50 and the second terminal 29 of the receptacle 14 has a conductor 51. The conductor 51 is split at a point 52 to form two leads or branches 53 and 54, respectively. The lead 54 is connected to the contactor point 40 of the switch 11. A capacitor 55 is located between the point 52 and the contactor point 39 of the switch 11. The conductor 50 of the terminal 28, the conductor 23 of the two-phase motors 10, and the conductor 27 of the two-phase generator 13 are connected at a common connection point 58 to form a common line. The conductors 25 and 26 are connected to the contactor points 37 and 38, respectively. The conductors 21 and 22 are connected to the contactor blades 43 and 42, respectively.

A single-phase source of power or energy 59 is adapted to be connected to a female type of plug 60 by means of conductors 61 and 62. The female plug 60 is adapted to be inserted in the receptacle 14 when the cover 31 is in the first or open position 35 to energize the terminals 28 and 29 with the single-phase type of energy. When the switch 11 is in the first position indicated by the full lines 44, the contactor points 37 and 38 are contactable or bridgeable by the contactor blades 42 and 43, respectively, thereby connecting the two-phase motors with the two-phase generator 13 and disconnecting the two-phase motors from the terminals 28 and 29 of the receptacle 14. When the switch 11 is in the second position indicated by the dotted lines 45, the contactor points 39 and 40 are contactable or bridgeable by the contactor blades 42 and 43, respectively, thereby connecting the terminals 28 and 29 of the receptacle 14 with the two-phase motors 10 and disconnecting the two-phase generator from the two-phase motors.

My mechanical switching arrangement is designed for particular use on railroad cars transporting perishable goods. In the past, the fans which circulated the air throughout the cars have been driven mechanically by means of belts attached to the fans from rubber rimmed pulleys on the car wheels. In the event the car was pulled onto a siding and stopped, the fans as a result would stop. It was therefore necessary to transport an electric motor to the car, disengage the belts from the rubber rimmed pulleys and engage the belts with a pulley mounted on the drive shaft of the electric motor. In the particular design that I have illustrated, it would be disastrous to connect the single-phase energy source to the two-phase generator, and it would be almost equally disastrous to fail to reconnect the two-phase generator to the system when the single-phase energy was disconnected and the car was ready to move. In the first instance, the permanent magnet type two-phase generator would be immediately demagnetized; and in the second instance, the perishable goods might spoil for lack of fan action.

In normal operation, when the vehicular wheel 17 is rotating, the plug 60 is removed and the cover 31 is in the position indicated by the full lines 34 because of the action of the spring 47 on the connecting member 46. This results in the switch 11 being maintained in the first position indicated by the full lines 44. When in this position, the circuit between the two-phase generator 13 and the two-phase motors 10 is closed and energy will be supplied to the two-phase motors from the two-phase generator 13, which derives its energy from the movement of the axle 16, of the vehicle, transmitted through the pulley 15.

When it is necessary that the vehicle be stopped, it necessarily follows that the motors 10 will stop. It will then be necessary to supply the energy to operate the motors from a convenient and standard source of domestic or industrial energy. As shown, this energy source is indicated at 59.

The cover 31 is opened to the first or open position 35 and the plug 60 is inserted into the receptacle 14 to energize the terminals 28 and 29 from the single-phase source 59. When the cover 31 is opened, this movement is transmitted to the switch 11, by way of the member 46, which as a result is thrown into its second position indicated by the dotted lines 45. The cover 31 is prevented from returning to its second or closed position 34 because of the position of the plug 60 when inserted into the receptacle 14. It is thus observed that this combination and cooperation of elements constitute means which are responsive to the movement of the closure means and insertion of the insert connection means within the receptacle to operate the switching means. This closes the circuit between the two-phase motors 10 and the receptacle 14 and opens the circuit between the two-phase motors 10 and the two-phase generator 13. The capacitor 55 serves to produce the necessary voltage-current relationship to operate the two-phase motors 10 from the single-phase source of energy.

By this novel and unique switching arrangement, I am able to insure that at no time will both sources of energy be connected to the fan motors or to each other.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with a two-phase motor, a first and second type of energy, said first type of energy being supplied by a two-phase generator and said second type of energy being supplied by a single-phase potential source, means for converting said second type of energy into substantially said first type of energy, first and second energizable terminals, a housing having a receptacle for said energizable terminals, cover means having open and closed positions, insert connection means insertable in said receptacle for energizing said first and second energizable terminals with said single-phase energy, switching means for selectively connecting and disconnecting said first and second types of energy to said two-phase motor, and means operably connecting said cover means to said switching means.

2. In the combination of a housing and an electrical circuit, said electrical circuit comprising, a two-phase generator having a first, second, and third conductor, a load having a first, second, and third conductor, first and second energizable terminals adapted to be energized by a source of single-phase energy, a capacitor having first and second terminals, a switch having first and second contactor blades, first and second contactor points engageable respectively by said blades in a first position for operating the load from said generator, third and fourth contactor points engageable respectively by said blades in a second position for operating the load from said potential source, first connection means for connecting said third conductor of said two-phase generator and said third conductor of said load and said first energizable terminal to form a common line, second connection means for connecting said first conductor of said generator to said first contactor point, third connection means for connecting said second conductor of said generator to said second contactor point, fourth connection means for connecting said first conductor of said load to said second contactor blade, fifth connection means for connecting said second conductor of said load to said first contactor blade, sixth connection means for connecting said second energizable terminal to said second terminal of said capacitor, seventh connection means for connecting said second energizable terminal to said fourth contactor point, eighth connection means for connecting said first terminal of said capacitor to said third contactor point, said housing comprising a receptacle for said first and second energizable terminals, cover means having first and second positions, insert connection means insertable in said receptacle for energizing said first and second energizable terminals with said single-phase energy, said cover means in said first position preventing insertion of said insert connection means into said receptacle and in said second position permitting insertion of said insert connection means into said receptacle, means operably connecting said cover means to said first and second contactor blades, said cover means maintaining said contactor blades in said first position while said cover means are in said first position, and said cover means maintaining said contactor blades in said second position while said cover means are in said second position.

3. In an electrical circuit comprising, a two-phase generator having a first, second, and third conductor, a load having a first, second, and third conductor, first and second energizable terminals adapted to be energized by a source of single-phase energy, cover means movable between first and second positions for selectively preventing and allowing energization of said first and second terminals, a capacitor having first and second terminals, a switch having first and second contactor blades, having first and second contactor points engageable respectively by said blades in a first position for operating the load from said generator, and having third and fourth contactor points engageable respectively by said blades in a second position for operating the load from said potential source, first connection means for connecting said first energizable terminal to both said third conductor of said two-phase generator and to said third conductor of said load, second connection means for connecting said first conductor of said generator to said first contactor point, third connection means for connecting said second conductor of said generator to said second contactor point, fourth connection means for connecting said first conductor of said load to said first contactor blade, fifth connection means for connecting said second conductor of said load to said second contactor blade, sixth connection means for connecting said second energizable terminal to said second terminal of said capacitor, seventh connection means for connecting said second energizable terminal to said fourth contactor point, eighth connection means for connecting said first terminal of said capacitor to said third contactor point, and means interconnecting said cover means and said switch whereby movement of said cover means moves said switch.

4. In combination with a two-phase motor, a two-pole double-throw switch having first and second positions, a first and a second source of power, said first power source being a permanent magnet, rotating field, two-phase generator, and said second power source being any standard single-phase power source, a receptacle having a first and a second energizable terminal, cover means having open and closed positions, insert connection means insertable in said receptacle for energizing said energizable terminals with said single-phase power when said cover means is in said open position, said single-phase power being transformed into substantially two-phase power by means of a suitable capacitor, mechanical connection means connecting said cover means with said two-pole double-throw switch in such manner that when said cover means is in said closed position said switch is in said first position and when said cover means is in said open position said switch is in said second position, said two-pole double-throw switch being arranged to connect said first power source with said motor and to disconnect said second power source from said motor when in said first position, and said switch being arranged to connect said second power source with said motor and to disconnect said first power source from said motor when in said second position.

5. In combination with a polyphase electrical load, a first and a second type of energy, said first type of energy being supplied by a polyphase electrical source and said second type of energy being supplied by a single-phase electrical source, means for converting said second type of energy into substantially said first type of energy, a receptacle having energizable terminals, cover means having first and second positions, insert connection means insertable in said receptacle for energizing said energizable terminals with said single-phase electrical energy, switching means for selectively connecting and disconnecting said first and second types of energy to said polyphase-electrical load, and means responsive to said cover means to operate said switching means.

6. In combination with an electrical load, a first and a second type of energy, means for converting said second type of energy into substantially said first type of energy, a receptacle having energizable terminals, closure means having first and second positions, insert connection means insertable into said receptacle for energizing said energizable terminals with said second type of energy, switching means for selectively connecting and disconnecting said first and second types of energy to said electrical load, and means responsive to movement of said closure means and insertion of said insert connection means within said receptacle to operate said switching means.

References Cited in the file of this patent
UNITED STATES PATENTS

| | | |
|---|---|---|
| 1,713,223 | Green | May 14, 1929 |
| 1,794,508 | Baughman | Mar. 3, 1931 |
| 2,461,717 | Bolisums | Feb. 15, 1949 |
| 2,667,611 | Rodianka | Jan. 26, 1954 |